United States Patent [19]  [11] 3,897,417
Warnant et al.  [45] July 29, 1975

[54] PROCESS FOR THE PREPARATION OF STEROIDAL SPIROLACTONES AND INTERMEDIATES
[75] Inventors: Julien Warnant, Neuilly-sur-Seine; Jean Jolly, Fontenay-sous-Bois, both of France
[73] Assignee: Roussel Uclaf, Paris, France
[22] Filed: Feb. 1, 1974
[21] Appl. No.: 438,601

[30] Foreign Application Priority Data
Feb. 6, 1973  France ........................ 73.04057

[52] U.S. Cl.. 260/239.57; 260/397.1; 260/239.55 R
[51] Int. Cl.² ........................................ C07C 173/00
[58] Field of Search ............................. 260/239.57

[56]  References Cited
  UNITED STATES PATENTS
3,257,390  6/1966  Patchett.................... 260/239.57

*Primary Examiner*—Elbert L. Roberts
*Attorney, Agent, or Firm*—Hammond & Littell

[57]  ABSTRACT
The present invention relates to a process for the preparation of steroidal spirolactones having the formula

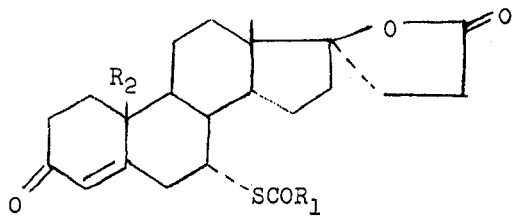

wherein $R_1$ is a linear alkyl having 1 to 4 carbon atoms and $R_2$ is hydrogen or methyl comprising the steps reacting a compound of the formula

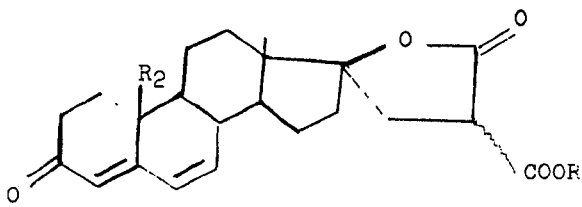

wherein R is alkyl having 1 to 4 carbon atoms and $R_2$ is defined above, with a thioalkanoic acid of the formula

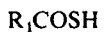

$R_1COSH$ wherein $R_1$ is defined above, heating the resultant product in a neutral media and recovering said steroidal spirolactones; as well as the intermediates.

12 Claims, No Drawings

PROCESS FOR THE PREPARATION OF STEROIDAL SPIROLACTONES AND INTERMEDIATES

THE PRIOR ART

It is known that the elimination of an ester function attached to the ring of a lactone is made by hydrolysis in an acid media or in a basic media followed by a decarboxylation (see, among others, Ficini et al, C. R. Acad. Sci. 1966, 263, 425; Newman et al., J. Am. Chem. Soc., 1945, 67, 233; Reid, J. Am. Chem. Soc., 1959, 81, 4632). However, the chemical literature does not mention that such a reaction can take place in a neutral media, particularly without a previous hydrolysis.

In addition, French Pat. No. 1,329,570 and U.S. Pat. No. 3,300,489 describe different processes for the production of somewhat similar steroidal spirolactones.

The prior art, therefore, would indicate that the elimination of an ester function attached to the ring of a lactone was not possible in a neutral media. However, it has been unexpectedly found that this operation is readily realizable and with excellent yields.

OBJECTS OF THE INVENTION

An object of the present invention is the application of the process of elimination of an ester function attached to the ring of a lactone by heating in a neutral media in the presence of water to produce steroidal spirolactones having the formula I

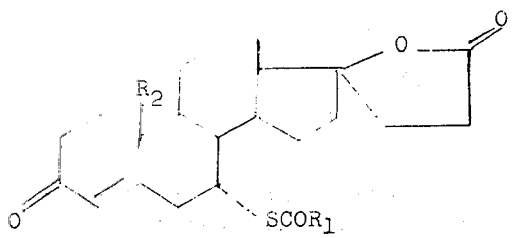

wherein $R_1$ is a linear alkyl having 1 to 4 carbon atoms and $R_2$ is hydrogen or methyl.

Another object of the present invention is the development of a process for the production of a steroidal spirolactone having the formula

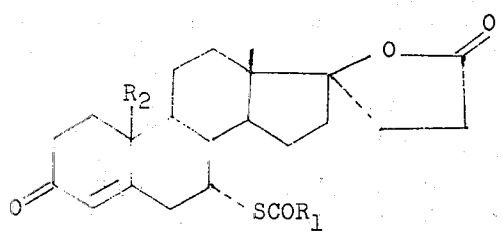

wherein $R_1$ is a linear alkyl having from 1 to 4 carbon atoms and $R_2$ is a member selected from the group consisting of hydrogen and methyl comprising the steps of heating a compound having the formula

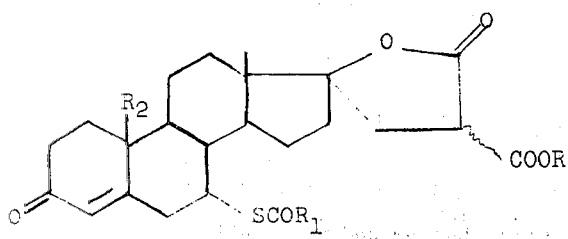

wherein R is an alkyl having 1 to 4 carbon atoms and $R_1$ and $R_2$ have the above meanings, in a neutral media and in the presence of water, and recovering said steroidal spirolactone.

A further object of the present invention is the obtaining of, as novel intermediates, a steriodal spirolactone ester having the formula

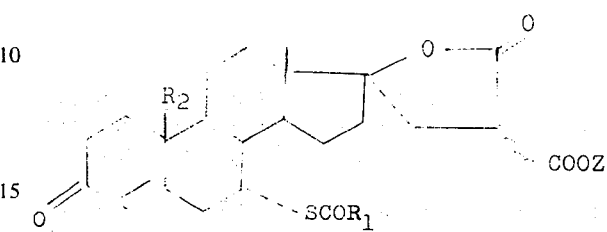

wherein Z is a member selected from the group consisting of hydrogen and alkyl having 1 to 4 carbon atoms, $R_1$ is linear alkyl having 1 to 4 carbon atoms and $R_2$ is a member selected from the group consisting of hydrogen and methyl.

A yet further object of the invention is the development of processes for the production of the above steroidal spirolactone ester intermediates.

These and other objects of the invention will become more apparent as the description thereof proceeds.

DESCRIPTION OF THE INVENTION

New processes have now been discovered for the preparation of steroidal spirolactones having the Formula I

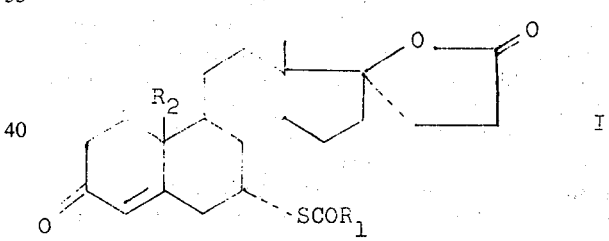

wherein $R_1$ is a linear alkyl having 1 to 4 carbon atoms and $R_2$ is hydrogen or methyl, characterized in that a steroidal compound having the formula II

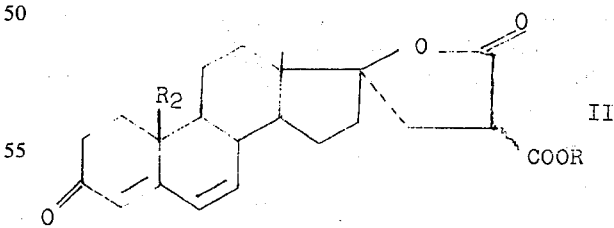

wherein R is a linear or branched alkyl having 1 to 4 carbon atoms and $R_2$ is hydrogen or methyl, is reacted with a thioalkanoic acid having the formula $R_1$ COSH wherein $R_1$ is a linear alkyl having 1 to 4 carbon atoms, in order to obtain a steroidal spirolactone ester having the formula III

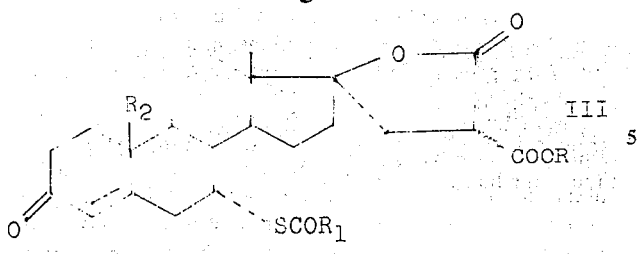

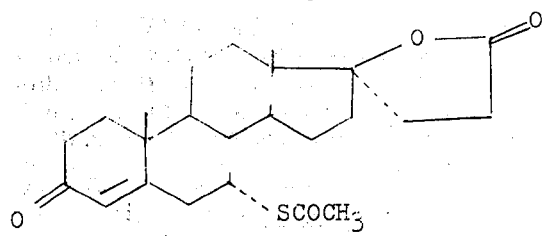

wherein R, $R_1$ and $R_2$ have the above-assigned meanings, which is transformed into products of Formula I by heating in a neutral media and in the presence of water.

In the above formulas, the alkyl of R is, for example, methyl, ethyl, propyl, isopropyl, butyl or tertiary butyl; the alkyl of $R_1$ is, for example, methyl, ethyl, propyl or butyl.

The passage of the products of the Formula III to products of the Formula I is made in the presence of water and in a neutral media, and consequently, in the present case, without addition of acid or alkaline substances and while operating at a temperature of at least 80°C, and more particularly at a temperature between 100°C and 160°C. The use of water at these temperatures conveniently requires operation in a closed vessel, thus under a slight pressure. This pressure depends on the solvent employed as the neutral media and the the temperature with the pressure being the sum of the partial pressures at the temperature employed.

The transformation of the products of Formula III into products of Formula I is unexpected for the following reasons. The hydrolysis of an ester of Formula III would require, according to the prior art, acid or alkaline conditions which would result, in the case of these products, in poor or no yields of the products of Formula I. This is not the same under neutral conditions which are employed according to the invention and which lead to the desired products with very good yields. Howeever, at this stage of the process, some difficulties of hydrolysis of the —COOR group would have been expected, accompanied by a partial or total degradation of the acylthio group. It is theorized that the mechanism of this unexpected reaction is the hydrolytic opening of the γ-lactone with the appearance of the free acid which would decarboxylate on its formation, then as intramolecular relactonization between the hydroxyl in the 17β position and the ester group on the linear chain, this relactonization occuring with elimination of the alkanol of the ester group.

The following reaction diagram illustrates this transformation:

characterized in that the compounds of the Formula $II_A$

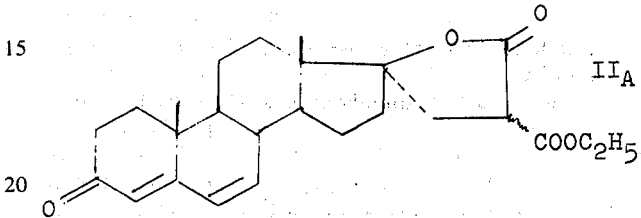

is treated with thioacetic acid $CH_3COSH$ to get the compounds of the Formula $III_A$

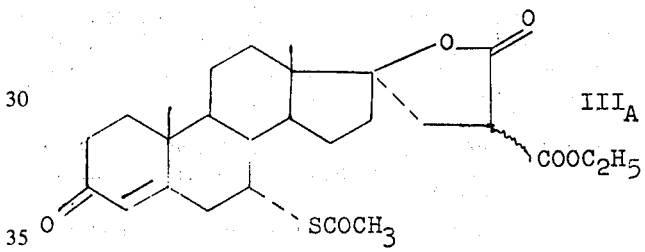

which is transformed into the compound of Formula I' by heating in a neutral media and in the presence of water. The transformation of the compounds of Formula $III_A$ into the compound of Formula I' can take place by heating between 80°C and 160°C.

The process of the invention thus allows one to transform products of the general formula III, having an acylthio group in the 7α position, into products of the general formula I under conditions compatible with the presence of this acylthio group, despite the lability of the latter, and this with excellent yields.

The products of the Formula I are known as interesting products in the therapeutical field (see Burger, 1970, Medicinal Chemistry, 3rd Edition, pages 1001 to 1003). The product of Formula I where $R_1$ and $R_2$ are methyl, thus the product of Formula I', is called

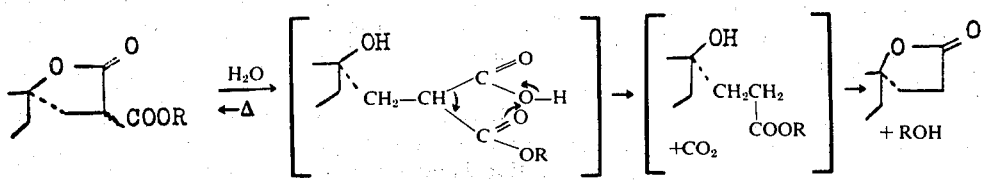

In the body of the process of the invention, occurs particularly the process for the preparation of the compound of the Formula Spironolactone, and can be utilized for its action on diuresis. In particular, it is utilized in the treatment of certain cardiac afflictions.

In a variant of the process of the invention, one can also operate according to a process characterized in that the preceding products of Formula II are hydrolyzed under alkaline conditions followed by an acidification in order to give products of the Formula II'

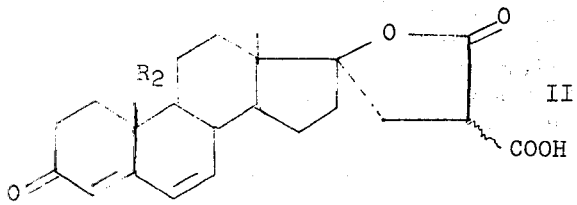

in which R₂ has the above-assigned values, which is then either 1. reacted with a thioalkanoic acid of the formula

R₁ COSH in which R₁ has the above-assigned values, in order to obtain products of the Formula III'

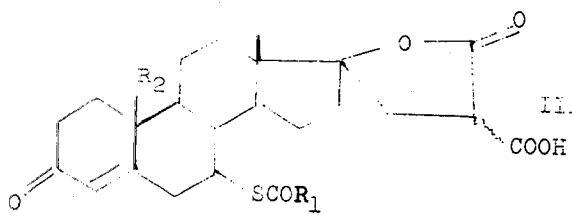

wherein R₁ and R₂ have the above-assigned values, which is transformed by heating into products of the Formula I, or 2. treated with an equimolar quantity of an alkaline base to obtain the corresponding alkaline salt of the Formula IV

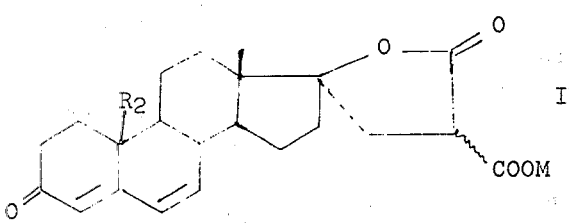

wherein R₂ has the above-assigned values and M is an atom of an alkaline metal, preferably an alkali metal, which is treated with a thioalkanoic acid of the formula

R₁ COSH to give products of the Formula III' which are transformed by heating into products of the Formula I, or 3. reacted with an excess of an alkaline base to obtain products of the Formula V

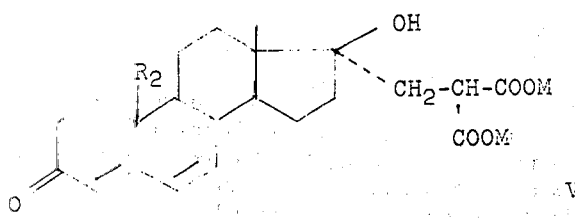

wherein R₂ and M have the above-assigned values, which is treated with a thioalkanoic acid of the formula

R₁ COSH to give products of the Formula III' which are transformed by heating into products of the Formula I.

The alkaline hydrolysis which is made in order to transform the products of Formula II into products of the Formula II' is effected preferably with the aid of an alkali metal hydroxide such as sodium hydroxide in an aqueous media. However, other alkaline reactants may be employed such as potassium hydroxide or sodium bicarbonate, the hydrolysis being conducted either in an aqueous media or in a hydroalcoholic media such as water and a water-soluble lower alkanol, for example water and ethanol.

The alkaline bases employed in order to transform the products of the Formula II' into alkaline salts of the Formula IV and V are the alkali metal hydroxides such as sodium or potassium hydroxide. The transformation of the products of Formula III' into products of the Formula I is effected by heating to at least 80°C and more advantageously to a temperature between 100°C and 220°C.

The invention also relates to a process for the preparation of a steroidal spirolactone of the formula I

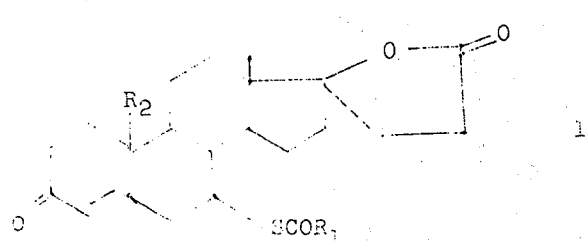

wherein R₁ is a linear alkyl having from 1 to 4 carbon atoms and R₂ is a member selected from the group consisting of hydrogen and methyl comprising the steps of heating a compound having the formula

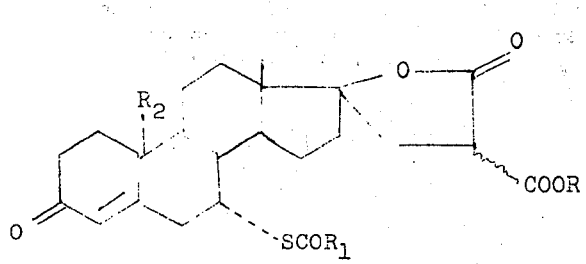

wherein R is an alkyl having 1 to 4 carbon atoms and R₁ and R₂ have the above meanings, in a neutral media and in the presence of water, and recovering said steroidal spirolactone.

Thus, in particular, the invention relates to a process for the preparation of a steroidal spirolactone having the formula I'

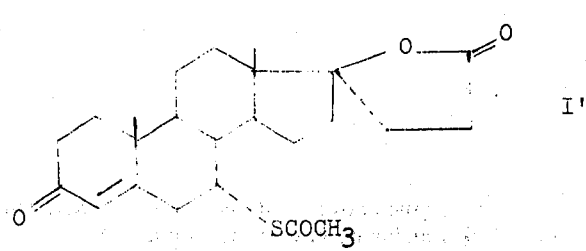

comprising the steps of heating a compound having the Formula III$_A$

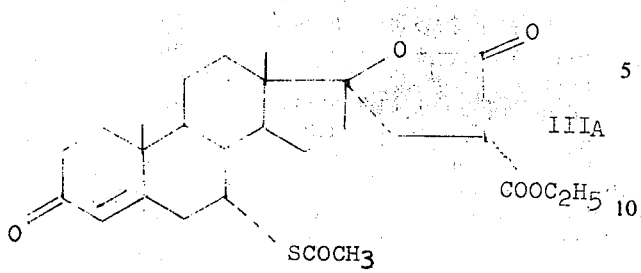

in a neutral media and in the presence of water, and recovering said steroidal spirolactone.

The starting products of the Formula II utilized at the start of the process and its variant can be prepared according to a method described in copending U.S. Pat. application Ser. No. 436,602, filed concurrently herewith.

This method is characterized in that a product having the formula VI

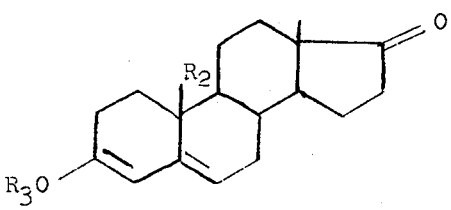

wherein R$_2$ is a member selected from the group consisting of hydrogen and methyl and R$_3$ is alkyl having 1 to 2 carbon atoms, is reacted with a trimethylsulfonium halide having the formula (CH$_3$)$_3$ S$^+$ X$^-$ wherein X is a halide selected from the group consisting of bromine and iodine, in the presence of a basic agent, the resulting product having the formula VII

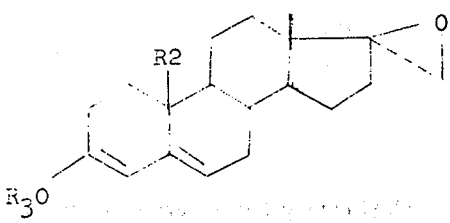

wherein R$_2$ and R$_3$ have the above-mentioned values, is dehydrogenated in the presence of a dehydrogenating agent, the resulting product having the Formula VIII

wherein R$_2$ has the above-mentioned values, is reacted with a dialkyl malonate having the formula IX

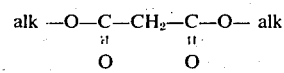

wherein alk is an alkyl having from 1 to 4 carbon atoms, in the presence of a basic agent, to obtain a compound of Formula II.

In the process, the basic agent employed in the reaction of trimethylsulfonium halide with a product of Formula VI, is preferably an alkaline alcoholate such as an alkali metal lower alkanolate, for example sodium ethylate, but an alkaline hydride can also be utilized such as an alkali metal hydride, for example sodium hydride. The dehydrogenating agent which is used to transform the products of Formula VII into products of Formula VIII is preferably tetrachloro-p-enzoquinone (chloranil), but other halogenated derivatives of p-benzoquinone can be employed, as for example 2,3-dichloro-5,6-dicyano-p-benzoquinone.

The basic agent employed in the reaction of the dialkyl malonate of Formula IX with a product of Formula VIII preferably is an alkaline alcoholate such as an alkali metal lower alkanolate, for example sodium ethylate. However, an alkaline amide or an alkaline hydride, such as an alkali metal amide or an alkali metal hydride, for example sodium amide or sodium hydride, can also be utilized in the reaction.

The epoxides of the Formula VII are in the 17$\beta$-configuration. The reaction employed for their preparation is stereospecific and gives this isomer exclusively.

The alkoxycarbonyl and hydroxycarbonyl (carboxy) functions attached to the lactone ring of the preceding various products are represented as being attached to the ring by a wavy line indicating that the two isomers, $\alpha$ and $\beta$, can be obtained and that the compounds obtained are in the form of the mixture of isomers.

The products of the Formula II, where R$_2$ represents the methyl radical, can also be prepared by a process characterized in that products having the above Formula VII where R$_2$ is methyl, are reacted with a dialkyl malonate having the above Formula IX in the presence of a basic agent to give products having the Formula XI

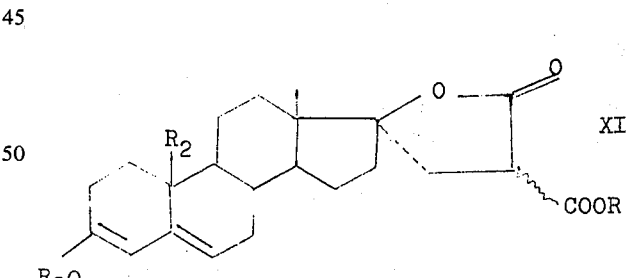

wherein R$_3$ is alkyl having 1 to 2 carbon atoms and R is alkyl having 1 to 4 carbon atoms, which are then treated with a dehydrogenating agent to obtain products of the Formula II where R$_2$ is methyl.

The basic agent employed in the reaction of the dialkyl malonate of Formula IX with the products of Formula VII where R$_2$ is methyl, is preferably an alkaline alcoholate such as an alkali metal lower alkanolate, for example sodium ethylate. However, an alkaline amide or hydride, such as an alkali metal amide or hydride, for example sodium amide or hydride can also be employed.

The dehydrogenating agent utilized to transform the products of Formula XI into products of Formula II where $R_2$ is methyl, preferably is tetrachloro-p-benzoquinone (chloranil), but other halogenated derivatives of p-benzoquinone can be employed, such as, for example, 2,3-dichloro-5,6-dicyano-p-benzoquinone.

The invention also relates to the process for the preparation of a steroidal spirolactone of Formula I as defined above, characterized in that the product of the Formula VI

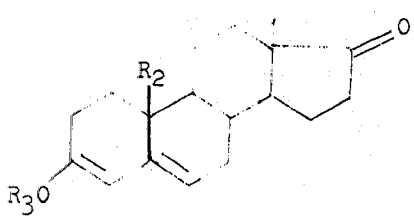

VI wherein $R_2$ is hydrogen or methyl and $R_3$ is alkyl having 1 or 2 carbon atoms, is reacted with a trimethylsulfonium halide of the formula

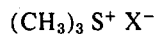

wherein X is bromine or iodine, in the presence of a basic agent, the resulting product of the Formula VII

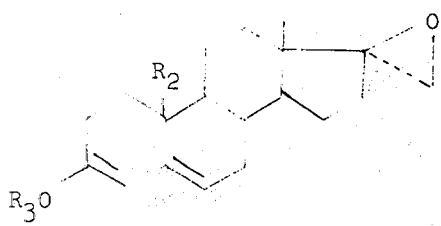

VII wherein $R_2$ and $R_3$ have the above-assigned values, is treated with a dehydrogenating agent, the resulting product of the Formula VIII

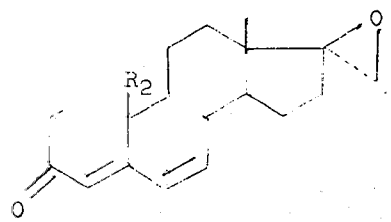

VIII wherein $R_2$ has the above-assigned values, is reacted with a dialkyl malonate of the Formula IX

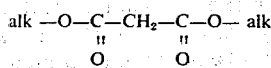

IX where alk is a linear or branched alkyl having 1 to 4 carbon atoms, in the presence of a basic agent, the resulting product of the Formula II

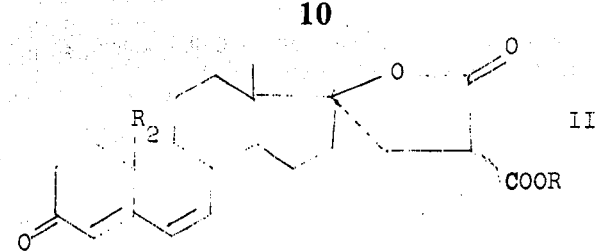

II wherein R and $R_2$ have the above-assigned values, is reacted with a thioalkanoic acid of the formula

wherein $R_1$ is linear alkyl having 1 to 4 carbon atoms, the resulting product of the Formula III

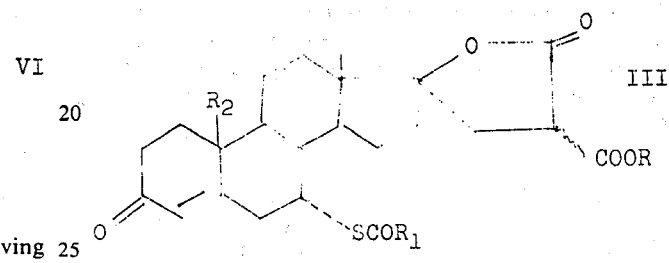

III wherein R, $R_1$ and $R_2$ have the above-assigned values, is heated in a neutral media and in the presence of water, and the products of Formula I are recovered.

Thus, in particular, the invention relates to a process for the production of the γ-lactone of 7α-acetyl-thio-17β-hydroxy-4-pregnen-3-one-21-carboxylic acid which comprises the steps of reacting 3-ethoxy-3,5-androstadien-17-one with trimethylsulfonium iodide in the presence of sodium hydride, dehydrogenating the resulting 3-ethoxyspiro-17β-oxiranyl-3,5-androstadiene with tetrachloro-p-benzoquinone, reacting the resulting spiro-17β-oxiranyl-4,6-androstadien-3-one with diethyl malonate in the presence of sodium ethylate, acylating the resulting spiro-[(4,6-androstadien-3-one)-17β,2'-(4'-ethoxycarbonyl-1'-oxa-cyclopentan-5'-one)] with thioacetic acid, heating the resulting spiro-[(7α-acetylthio-4-androsten-3-one)-17β,2'-(4'-ethoxycarbonyl-1'-oxa-cyclopentan-5'-one)] in a neutral media and in the presence of water, and recovering said γ-lactone of 7α-acetylthio-17β-hydroxy-4-pregnen-3-one-21-carboxylic acid.

In addition, the variants of the process of the invention lead from the products of the Formula II to the products of Formula I.

The invention also relates to, as novel intermediates, a steroidal spirolactone ester having the formula

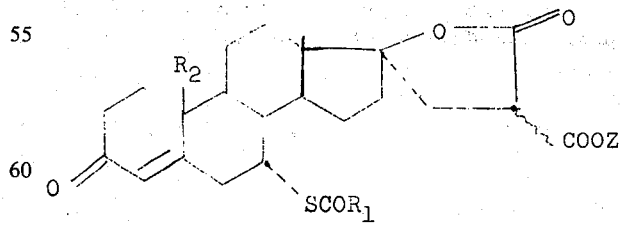

wherein Z is a member selected from the group consisting of hydrogen and alkyl having 1 to 4 carbon atoms, $R_1$ is linear alkyl having 1 to 4 carbon atoms and $R_2$ is a member selected from the group consisting of hydrogen and methyl. These products are obtained in the course of the preceding processes or variants thereof and correspond to compounds of the formulas II and II'. Within the scope of the above are the following compounds:

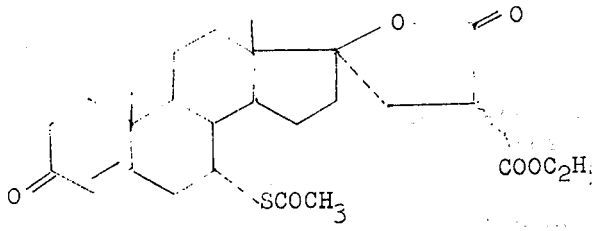

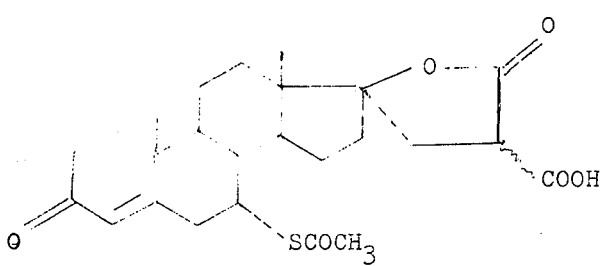

and

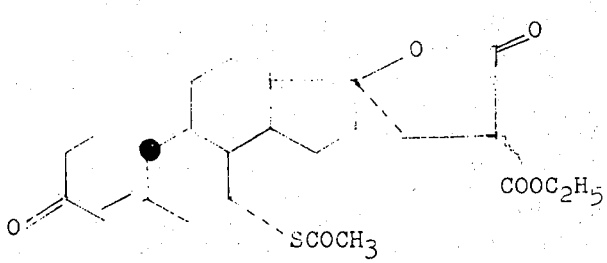

The process according to the invention, as well as the intermediate products produced, permit the preparation of therapeutically interesting products of the steroid series; starting from simple compounds and in a small number of steps, each of which gives a good yield as can be seen hereafter in the examples.

The following examples illustrate the invention without being limitative in any respect.

EXAMPLE 1

Spiro-[(4,6-androstadien-3-one)-17β,2'-(4-ethoxycarbonyl-1'-oxa-cyclopentan-5'-one)]

Step A 3-ethoxy-spiro-17β-oxiranyl-3,5-androstadiene:

45.2 gm of sodium hydride were placed in suspension in 1500 cc of dimethylsulfoxide. The suspension was heated to 60°C for 2 hours and then allowed to stand overnight at room temperature. Then, 1200 cc of tetrahydrofuran were added to the black solution obtained. The material was cooled to −5°C and 384 gm of trimethylsulfonium iodide in suspension in 1350 cc of dimethylsulfoxide was added. The preceding mixture was then cooled to −5°C and 150 gm of 3-ethoxy-3,5-androstadien-17-one (prepared starting from 4-androsten-3,17-dione according to Serini et al., Ber. 1938, 71, 1766) dissolved in 1200 cc of tetrahydrofuran was introduced. The reaction mixture was then allowed to return to room temperature and agitated for 17 hours. The reaction mixture was then poured into 15 liters of iced water and agitated for one hour. The precipitate formed was vacuum filtered, washed with water and dried. The product was purified by recrystallization from acetone, which gave 139.7 gm of 3-ethoxy-spiro-17β-oxiranyl-3,5-androstadiene in the form of colorless crystals.

Melting Point: 105°C $[\alpha]_D^{20} = -161°$ ($c=1\%$ in ethanol containing 1% pyridine)

Analysis: $C_{22}H_{32}O_2$: Calculated: 80.44% C; 9.82% H; Found: 80.5%; 10.0% Step B Spiro-17β-oxiranyl-4,6-androstadien-3-one.

50 gm of the product obtained in the preceding step was placed in suspension in 750 cc of acetone containing 5% of water. 37.5 gm of tetrachloro-p-benzoquinone were added to this suspension in the absence of light and the mixture was agitated for 3 hours at room temperature.

The reaction mixture was poured into 2.5 L of water containing 100 cm3 of 36° Be sodium hydroxide and agitated for one hour. The precipitate formed was vacuum filtered; washed with water and dried.

The product was dissolved in methylene chloride and purified by filtration through alumina. After evaporation of the solvent and trituration of the residue with acetone, 39 gm of spiro-17β-oxiranyl-4,6-androstadien-3-one were obtained in the form of colorless crystals.

Melting Point: 240°C $[\alpha]_D^{20} = +39°$ ($c = 0.5\%$ in chloroform)

Analysis: $C_{20}H_{26}O_2$: Calculated: 80.50%; 8.78% H; Found: 80.2%; 9.0%

Step C Spiro-[(3-ethoxy-3,5-androstadiene)-17β,2'-(4'-ethoxycarbonyl-1'-oxa-cyclopentan-5'-one)]

An ethanolic solution of sodium ethylate was prepared starting from 3.15 gm of sodium and 150 cc of ethanol. 45.8 gm of diethyl malonate and 30 gm of the product prepared from Step A were added to this solution. The mixture was heated to reflux for 5 hours, then cooled to room temperature. The reaction mixture was poured into a saturated aqueous solution of ammonium chloride and agitated for one hour. The precipitate formed was vacuum filtered, washed with water and dried.

The product was purified by recrystallization from absolute ethanol, giving 31.6 gm of spiro-[(3-ethoxy-3,5-androstadiene)-17β,2'-(4'-ethoxycarbonyl-1'-oxa-cyclopentan-5'-one)] in the form of colorless crystals.

Melting Point: 131°C

Analysis: $C_{27}H_{38}O_5$: Calculated: 73.27% C; 8.65% H; Found: 73.0 %; 8.8 %

Step D Spiro-[(4,6-androstadien-3-one)-17β,2'-(4'-ethoxycarbonyl-1'-oxa-cyclopentan-5'-one)]

An ethanolic solution of sodium ethylate was prepared starting from 5.39 gm of sodium and 350 cc of absolute ethanol. 46.9 gm of diethyl malonate and 35 gm of the product prepared from Step B was added to this solution. The mixture was heated to reflux for 3 hours and then cooled to room temperature. The reaction mixture was then poured into a solution of 175 gm of ammonium chloride in 875 cc of iced water and agitated for one hour. The precipitate formed was vacuum filtered, washed with water and dried.

The product was purified by recrystallization from absolute ethanol, giving 41.3 gm of spiro-[(4,6-androstadien-3-one)-17α,2'-(4'-ethoxycarbonyl-1'- oxa-cyclopentan-5'-one)] in the form of colorless crystals.

The NMR spectra shows that the product is constituted by a mixture of almost equal parts of each of the isomers at the point of the ethoxycarbonyl substituent.
Melting Point: 149°C
$[\alpha]_D^{20} = -25°$ (c=0.5% in chloroform)
U. V. Spectra - Ethanol
  λ max. at 284 nm; $\epsilon = 26,000$
  Analysis: $C_{25}H_{32}O_5$: Calculated: 72.78% C; 7.81% H;
Found: 72.7 %; 7.7 %

Step D' Spiro-[(4,6-androstadien-3-one)-17β,2'-(4'-ethoxycarbonyl-1'-oxa-cyclopentan-5-one)]

30 gm of the product prepared in Step C was placed in suspension in 300 cc of acetone containing 5% of water. 18.2 gm of tetrachloro-p-benzoquinone was added to this suspension and the mixture was agitated for two hours at room temperature in the absence of light. The reaction mixture was then poured into 1500 cc of water and extracted with methylene chloride. After drying and evaporation of the extraction solvent, the residue was taken up by 280 cc of methylene chloride. The insolubles were filtered and the filtrate was treated with alumina. After elimination of the alumina and evaporation of the solvent, the residue was recrystallized from ethanol. 15.1 gm of spiro-[(4,6-androstadien-3-one)-17β,2'-(4'-ethoxycarbonyl-1'-oxa-cyclopentan-5'-one)] were obtained in the form of colorless crystals.
Melting Point: 149°C
U.V. Spectra - Ethanol
  μ Max. at 284 nm; $\epsilon = 26,000$
The product is identical to that described in Step D.

EXAMPLE 2

Spiro-[(4,6-androstadien-3-one)-17β,2'-(4'-carboxy-1'-oxa-cyclopentan-5'-one)]

40 gm of the product of Step D in Example 1 were introduced into 200 cc of water containing 200 cc of an aqueous solution of 2N sodium hydroxide. The mixture obtained was agitated for fifteen hours at room temperature, giving an orange colored solution. This solution was cooled to 5°C and treated with 70 cc of an aqueous solution of 6N hydrochloric acid. The precipitate obtained was vacuum filtered after one hour of agitation, washed with water and dried.

The product was purified by dissolution in normal aqueous sodium hydroxide and recrystallization by concentrated hydrochloric acid. 35.4 gm of spiro-[(4,6-androstadien-3-one)-17β,2'-(4'-carboxy-1'-oxa-cyclopentan-5'-one)] was obtained in the form of colorless crystals.
Melting Point: Decomposition starting from 130°C
$[\alpha]_D^{20} = -35°$ (c = 1% in chloroform)
U. V. Spectra- Ethanol
  λ Max. at 283 nm; $\epsilon = 25,850$
  Analysis: $C_{23}H_{28}O_5$: Calculated: 71.85% C; 7.34% H;
Found: 71.6 %; 7.5 %

EXAMPLE 3

Spiro-[(4,6-estradien-3-one)-17β,2'-(4'-ethoxycarbonyl-1'-oxa-cyclopentan-5'-one)]

Step A 3-ethoxy-spiro-17β-oxiranyl-3,5-estradiene 14.3 gm of sodium methylate were placed in suspension in 125 cc of dimethylsulfoxide. The suspension was heated to 60°C for 2 hours, then brought to 7°C.
50 cc of tetrahydrofuran, 26 gm of trimethylsulfonium bromide and 25 gm of 3-ethoxy-3,5-estradien-17-one (prepared according to Djerassi, J. Am. Chem. Soc. 1953, 75, 4117) dissolved in 150 cc of tetrahydrofuran were added to the cooled suspension. The temperature of the mixture was brought to 20°C and the mixture was agitated at this temperature for 2 hours. 1 liter of iced water was then added thereto, then the precipitate formed was vacuum filtered and washed with water. The product was recrystallized from ethanol, giving 22.7 gm of 3-ethoxy-spiro-17β-oxiranyl-3,5-estradiene in the form of colorless crystals.
Melting Point: 160°C
$[\alpha]_D^{20} = -177°$ (c = 1% in pyridine)
  Analysis: $C_{21}H_{30}O_2$: Calculated: 80.21% C; 9.62% H;
Found: 79.9 %; 9.7 %

Step B Spiro-17β-oxiranyl-4,6-estradien-3-one

While operating as in Step B of Example 1, but while utilizing 20 gm of 3-ethoxy-spiro-17β-oxiranyl-3,5-estradiene, 12.3 gm of spiro-17β-oxiranyl-4,6-estradien-3-one were obtained after recrystallization from acetone, in the form of colorless crystals.
Melting Point: 184°C
$[\alpha]_D^{20} = -32.6°$ (c = 0.5% in chloroform)
  Analysis: $C_{19}H_{24}O_2$; Calculated: 80.24% C; 8.51% H;
Found: 80.5 %; 8.7 %

Step C Spiro-[(4,6-estradien-3-one)-17β,2'-(4'-ethoxycarbonyl-1'-oxa-cyclopentan-5'-one)]

While operating as in Step D of Example 1, but while utilizing 11 gm of spiro-17β-oxiranyl-4,6-estradien-3-one, 9 gm of spiro-[(4,6-estradien-3-one)-17β,2'-(4'-ethoxycarbonyl-1'-oxa-cyclopentan-5'-one)] were obtained after recrystallization from ethanol, in the form of colorless crystals.

The NMR spectra showed that the product is in the form of a mixture of isomers at the point of the ethoxycarbonyl substituent.

Two supplementary recrystallizations from ethanol gave a single product.
Melting Point: 185°C – 186°C
$[\alpha]_D^{20} = -130°$ (c = 0.5% in chloroform)
  Analysis: $C_{24}H_{30}O_5$: Calculated: 72.34% C; 7.59% H;
Found: 72.2 %; 7.3 %

EXAMPLE 4

The disodium salt of 2'carboxy-3'-(17β-hydroxy-3-oxo-4,6-androstadien-17-yl)-propionic acid.

5 gm of spiro-[(4,6-androstadien-3-one)-17β,2'-(4'-carboxy-1'-oxa-cyclopentan-5'-one)] were placed in suspension in 30 cc of water. 1.09 gm of sodium bicarbonate were added and the mixture was agitated for 3½ hours at room temperature. The solution obtained was cooled to 0°C and 12.7 cc of aqueous N sodium hydroxide was added dropwise. The mixture was agitated for 1½ hours at 0°C, then for 24 hours at room temperature. The water was then evaporated under vacuum at a low temperature and a white solid was obtained. This was recrystallized by solution in water and precipitation by acetone. 4.28 gm of the disodium salt of 2'-carboxy-3'-(17β-hydroxy-3-oxo-4,6-androstadien-17-yl)-propionic acid were thus obtained in the form of cream colored crystals.
Melting Point: Higher than 250°C
U. V. Spectra- Ethanol - 0.1N HCl
  λ Max. at 284 nm; $\epsilon = 25,600$ Analysis: $C_{23}H_{28}Na_2O_6$: Calculated: 61.87% C; 6.32% H; 10.3% Na; Found: 61.9 %; 6.0 %; 10.4%

EXAMPLE 5

γ-lactone of 7α-acetylthio-17β-hydroxy-4-pregnen-3-one-21-carboxylic acid.

Step A Spiro-[(7α-acetylthio-4-androsten-3-one)-17β,2'-(4'-ethoxycarbonyl-1'-oxa-cyclopentan-5'-one)]

25 gm of the product of Example 1 was placed in suspension in 50 cc of ethanol containing 6 cc of thioacetic acid. This suspension was heated to 65°C, giving a yellow solution which is maintained at this temperature for two hours. After cooling, the precipitate obtained was vacuum filtered and washed with cold ethanol. 25.5 gm of spiro-[(7α-acetylthio-4-androsten-3-one)-17β,2'-(4'-ethoxycarbonyl-1'-oxa-cyclopentan-5'-one)] were obtained in the form of colorless crystals.

The NMR spectra showed that the product was constituted by almost equal parts of each of the isomers at the point of the ethoxycarbonyl substituent.

Melting Point: 230°C
$[\alpha]_D^{20} = -16°$ ($c = 1\%$ in chloroform)
U.V. Spectra- Ethanol
Max. at 239 nm; $\epsilon = 19,800$
Analysis: $C_{27}H_{36}O_6$ S: Calculated: 6.56% S; Found: 6.5 %

Step B α-lactone of 7α-acetylthio-17β-hydroxy-4-pregnen-3-one-21-carboxylic acid.

10 gm. of spiro-[(7α-acetylthio-4-androsten-3-one)-17β,2'-(4'-ethoxycarbonyl-1'-oxa-cyclopentan-5'-one)], 200 cc of toluene and 20 cc of water were introduced into a one-liter autoclave. The autoclave was closed and brought under agitation to a temperature of 130°C to 140°C. The pressure attained about 4 kg/cm². The heating and agitation were continued for 16 hours. Then the reaction media was evaporated under vacuum and a gummy residue was obtained which was crystallized by the addition of an equal volume of methanol. The crystals were vacuum filtered and recrystallized two times from methanol. 6.8 gm of the γ-lactone of 7-α-acetylthio-17β-hydroxy-4-pregnen-3-one-21-carboxylic acid were thus obtained in the form of colorless crystals melting at 140°C then, after resolidification, at 210°C.

$[\alpha]_D^{20} = -35°$ (c = 1% in chloroform)
U.V. Spectra- Ethanol
λ Max. at 239 nm; $\epsilon = 19,500$

EXAMPLE 6

γ-lactone of 7α-acetylthio-17β-hydroxy-4-pregnen-3-one-21-carboxylic acid

Step A Spiro-[(7α-acetylthio-4-androsten-3-one)-17β,2'-(4'-carboxyl-1'-oxa-cyclopentan-5'-one)]

5 gm of the product prepared in Example 2 were dissolved in 10 cc of thioacetic acid and heated to reflux for 1 hour. After cooling, 10 cc of methanol containing 10% of water was added thereto and the solution obtained was poured into 100 cc of water. Agitation was continued for a half hour at room temperature, then the precipitate obtained was vacuum filtered, washed with water and dried.

The product obtained was purified by dissolution in an aqueous sodium bicarbonate solution, filtration and reprecipitation by diluted hydrochloric acid. 4.2 gm of spiro-[(7α-acetylthio-4-androsten-3-one)-17β,2'-(4'-carboxyl-1'-oxa-cyclopentan-5'-one)] were thus obtained in the form of colorless crystals.

Melting Point: Underwent decarboxylation at 160°C
$[\alpha]_D^{20} = -7°$ ($c = 1\%$ in chloroform)
Analysis: $C_{25}H_{32}O_6S$: Calculated: 65.19% C; 7.00% H; 6.96% S; Found: 64.9%; 7.1; 7.1%

Step B γ-lactone of 7α-acetylthio-17β-hydroxy-4-pregnen-3-one-21-carboxylic acid 1 gm of spiro-[(7α-acetylthio-4-androsten-3-one)-17β, 2'-(4'-carboxy-1'-oxa-cyclopentan-5'-one)] was placed in a balloon flask. The balloon flask was heated on a bath maintained at 185°C. A very clear and rapid decarboxylation was observed. The flask was cooled and the gummy residue obtained was dissolved in methanol at reflux. Crystallization occurred on cooling. The crystals were vacuum filtered and recrystallized from methanol. 278 mg of the γ-lactone of 7α-acetylthio-17β-hydroxy-4-pregnen-3-one-21-carboxylic acid were thus obtained in the form of colorless crystals melting at 210°C $[\alpha]_D^{20} = -34°$ ($c = 1\%$ in chloroform)
U.V. Spectra- Ethanol
λ Max. at 238 nm; $\epsilon = 18,900$

EXAMPLE 7

γ-lactone of 19-nor-7α-acetylthio-17β-hydroxy-4-pregnen-3-one-21-carboxylic acid.

Step A Spiro-[(7α-acetylthio-4-estren-3-one)-17β,2'-(4'-ethoxycarbonyl-1'-oxa-cyclopentan-5'-one)]

By operating as in Step A of Example 5, but by starting with 7 gm of the product obtained in Example 3. 7.1 gm of spiro-[(7α-acetylthio-4-estren-3-one)-17β,2'(4'-ethoxycarbonyl-1'-oxa-cyclopentan-5'-one)] were obtained in the form of colorless crystals.

The NMR spectra shows that the product is constituted by a mixture of isomers at the point of the ethoxycarbonyl substituent.

Melting Point: 210°C
U.V. Spectra- Ethanol
λ Max. at 238 nm; $\epsilon = 20,700$
Analysis: $C_{20}H_{34}O_6$ S: Calculated: 65.80% C; 7.22% H; 6.76% S; Found: 65.8%; 7.5%; 6.7%

Step B γ-lactone of 19-nor-7α-acetylthio-17β-hydroxy-4-pregnen-3-one-21-carboxylic acid By operating as in Step B of Example 5, but carried out on 2 gm of the product prepared in Step A above, 1.4 gm of the γ-lactone of 19-nor-7α-acetylthio-17β-hydroxy-4-pregnen-3-one-21-carboxylic acid were obtained in the form of colorless crystals.

Melting Point: 126°C–127°C, then after resolidification, 185°C
$[\alpha]_D^{20} = -73.5°$ ($c = 0.5\%$ in chloroform)
U.V. Spectra- Ethanol
λ Max. at 237 nm; $\epsilon = 19,750$ The preceding specific embodiments are illustrative of the practice of the invention. It is to be understood, however, that other expedients known to those skilled in the art or disclosed herein may be employed without departing from the spirit of the invention or the scope of the appended claims.

We claim:

1. A process for the production of a steroidal spirolactone having the formula

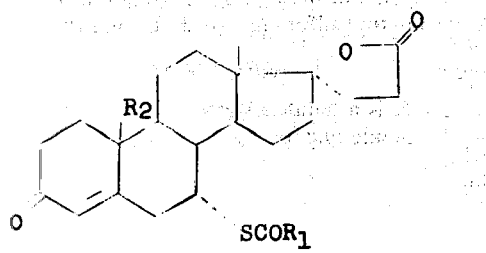

wherein $R_1$ is a linear alkyl having from 1 to 4 carbon atoms and $R_2$ is a member selected from the group consisting of hydrogen and methyl comprising the steps of heating a compound having the formula

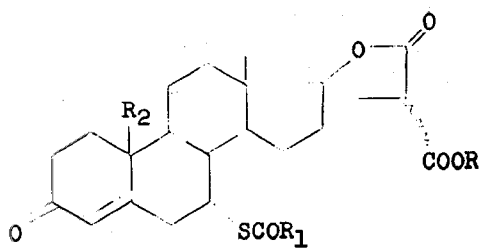

wherein R is an alkyl having 1 to 4 carbon atoms and $R_1$ and $R_2$ have the above meanings, to a temperature of from 80°C to 160°C in a neutral media and in the presence of water, and recovering said steroidal spirolactone.

2. A process for the preparation of a steroidal spirolactone having the formula

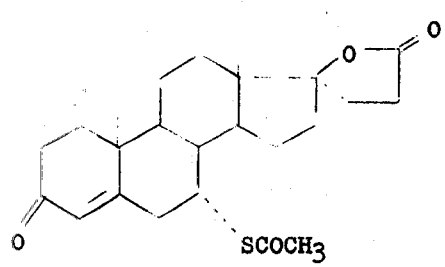

comprising the steps of heating a compound having the formula

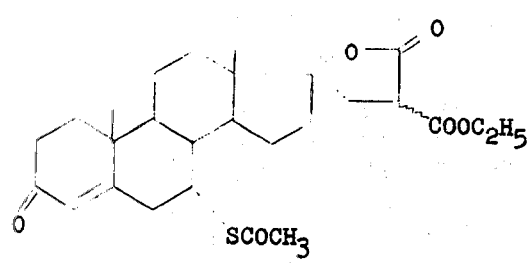

to a temperature of from 80°C to 160°C in a neutral media and in the presence of water, and recovering said steroidal spirolactone.

3. A process for the production of a steroidal spirolactone having the formula

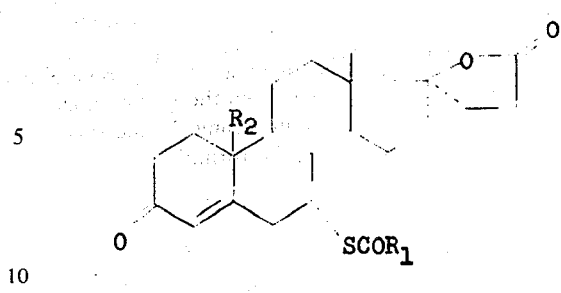

wherein $R_1$ is a linear alkyl having 1 to 4 carbon atoms and $R_2$ is a member selected from the group consisting of hydrogen and methyl, comprising the steps of reacting a compound having the formula

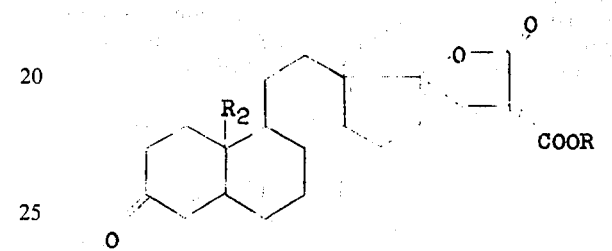

wherein R is an alkyl having 1 to 4 carbon atoms and $R_2$ has the above-assigned values, with a thioalkanoic acid having the formula

wherein $R_1$ has the above assigned values, heating the resulting compound having the formula

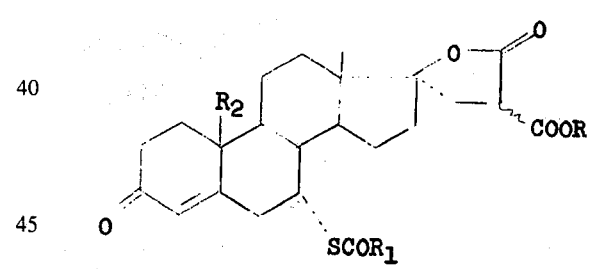

wherein R, $R_1$ and $R_2$ have the above-assigned values, to a temperature of from 80°C to 160°C in a neutral media and in the presence of water, and recovering said steroidal spirolactone.

4. The process of claim 3 wherein R is ethyl, $R_1$ is methyl and $R_2$ is methyl.

5. A process for the production of a steroidal spirolactone having the formula

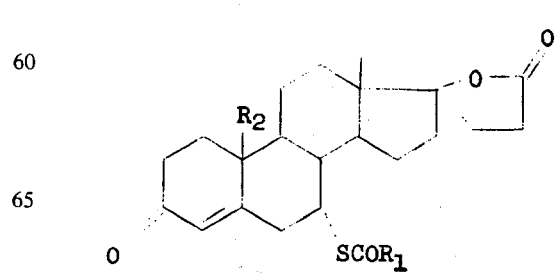

wherein $R_1$ is a linear alkyl having 1 to 4 carbon atoms and $R_2$ is a member selected from the group consisting of hydrogen and methyl, comprising the steps of subjecting a compound having the formula

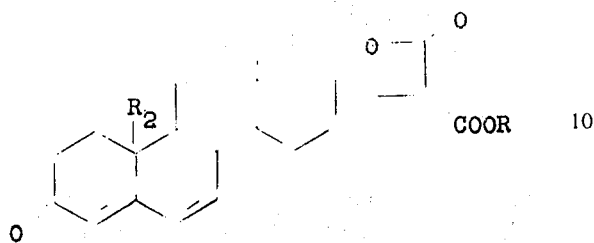

wherein R is an alkyl having 1 to 4 carbon atoms and $R_2$ has the above-assigned values, to an aqueous alkaline hydrolysis in the presence of an alkaline hydrolysis agent, reacting the resulting compound having the formula selected from the group consisting of

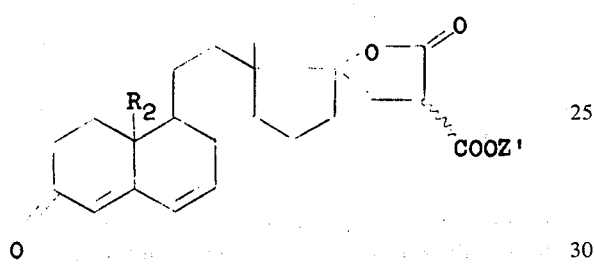

and

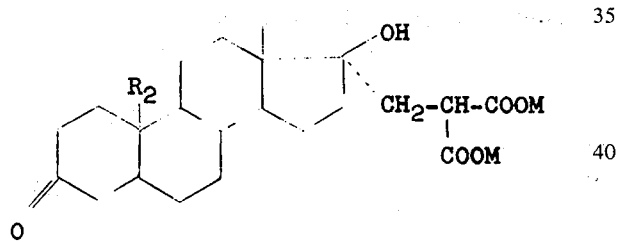

wherein $R_2$ has the above-assigned values, Z' is a member selected from the group consisting of hydrogen and an alkali metal and M is an alkali metal, with a thioalkanoic acid having the formula $$R_1 \text{COSH}$$

wherein $R_1$ has the above-assigned values, decarboxylating the resultant 7α-acylthio compound by heating to a temperature of from 80°C to 220°C and recovering said steroidal spirolactone.

6. A process for the production of a steroidal spirolactone having the formula

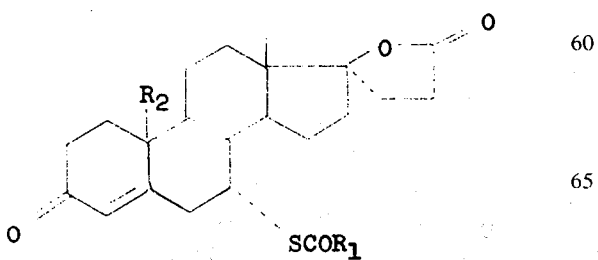

wherein $R_1$ is a linear alkyl having 1 to 4 carbon atoms and $R_2$ is a member selected from the group consisting of hydrogen and methyl, comprising the steps of reacting a trimethylsulfonium halide having the formula $$(CH_3)_3 S^+ X^-$$

wherein X is a halide selected from the group consisting of bromide and iodide, with a compound having the formula

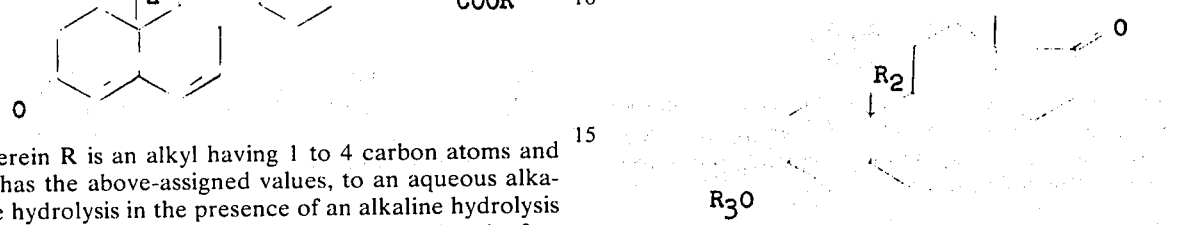

wherein $R_2$ has the above-asssigned values and $R_3$ is alkyl having 1 to 2 carbon atoms, in the presence of a basic agent, the resulting product having the formula

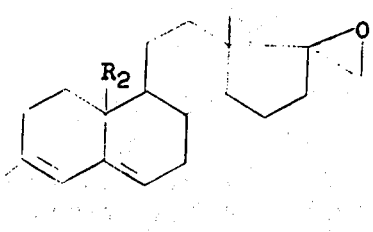

wherein $R_2$ and $R_3$ have the above-mentioned values, is dehydrogenated in the presence of a halogenated derivative of p-benzoquinone dehydrogenating agent, the resulting product having the formula

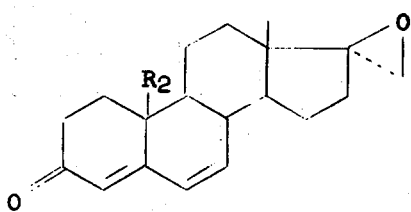

wherein $R_2$ has the above-mentioned values, is reacted with a dialkyl malonate having the formula $$\text{alk} -O-\underset{\underset{O}{\|}}{C}-CH_2-\underset{\underset{O}{\|}}{C}-O- \text{alk}$$

wherein alk is an alkyl having from 1 to 4 carbon atoms, in the presence of a basic agent, reacting the resulting compound having the formula

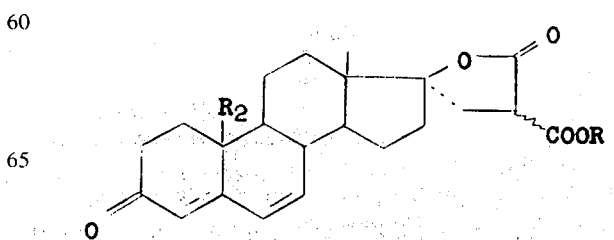

wherein R is an alkyl having 1 to 4 carbon atoms and R₂ has the above-assigned values, with a thioalkanoic acid having the formula

R₁COSH wherein R₁ has the above-assigned values, heating the resulting compound having the formula

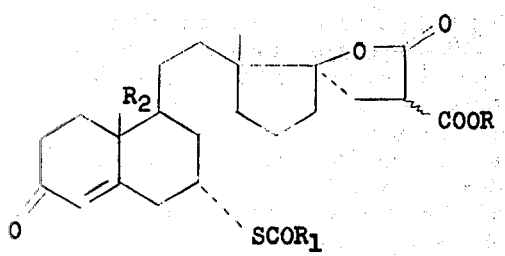

wherein R, R₁ and R₂ have the above-assigned values, to a temperature of from 80°C to 160°C in a neutral media and in the presence of water, and recovering said steroidal spirolactone.

7. A process for the production of a steroidal spirolactone having the formula

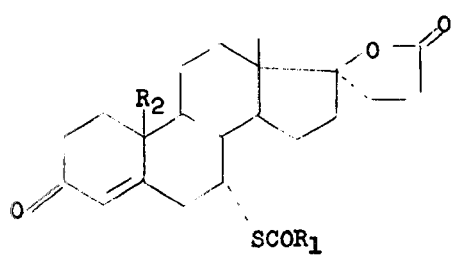

wherein R₁ is a linear alkyl having 1 to 4 carbon atoms and R₂ is a member selected from the group consisting of hydrogen and methyl comprising the steps of reacting a trimethylsulfonium halide having the formula (CH₃)₃S⁺X⁻ wherein X is a halide selected from the group consisting of bromide and iodide, with a compound having the formula

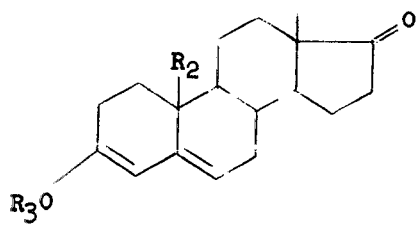

wherein R₂ has the above-assigned values and R₃ is alkyl having 1 to 2 carbon atoms, in the presence of a basic agent, the resulting product having the formula

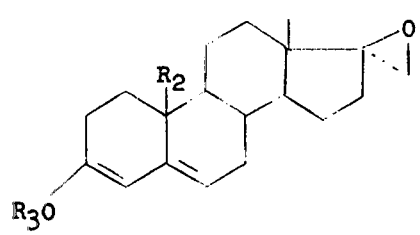

wherein R₂ and R₃ have the above-mentioned values, is dehydrogenated in the presence of a halogenated derivative of p-benzoquinone dehydrogenating agent, the resulting product having the formula

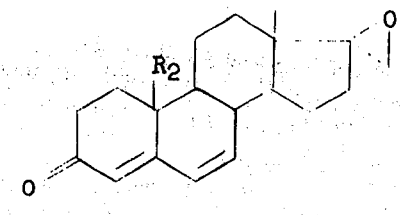

wherein R₂ has the above-mentioned values, is reacted with a dialkyl malonate having the formula alk —O—C—CH₂—C—O— alk
       ‖          ‖
       O         O wherein alk is an alkyl having from 1 to 4 carbon atoms, in the presence of a basic agent, subjecting the resulting compound having the formula

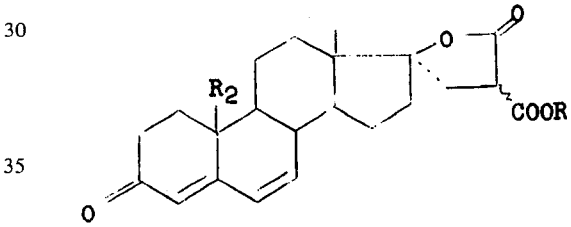

wherein R is an alkyl having 1 to 4 carbon atoms and R₂ has the above-assigned values, to an aqueous alkaline hydrolysis in the presence of an alkaline hydrolysis agent, reacting the resulting compound having the formula selected from the group consisting of

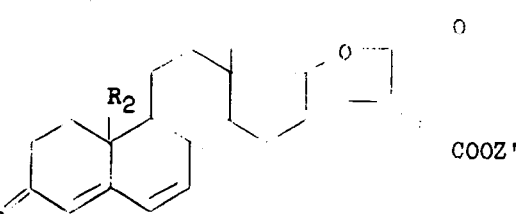

and

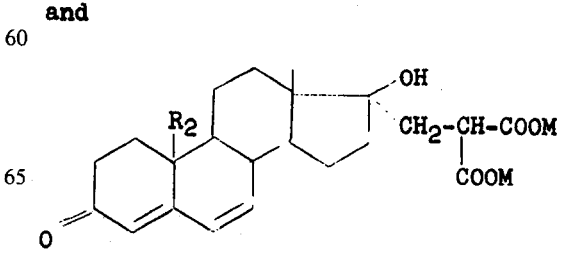

wherein $R_2$ has the above-assigned values, Z' is a member selected from the group consisting of hydrogen and an alkali metal and M is an alkali metal, with a thioalkanoic acid having the formula $$R_1 COSH$$

wherein $R_1$ has the above-assigned values, decarboxylating the resultant 7α-acylthio compound by heating to a temperature of from 80°C to 220°C and recovering said steroidal spirolactone.

8. The process of claim 6 wherein R is ethyl $R_1$ is methyl, $R_2$ is methyl and $R_3$ is ethyl alk is ethyl, X is the iodide, the first basic agent is sodium hydride, the dehydrogenating agent is tetrachloro-p-benzoquinone, and the second basic agent is sodium ethylate.

9. A steroidal spirolactone ester having the formula

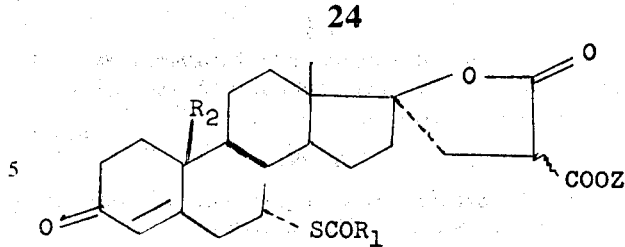

wherein Z is a member selected from the group consisting of hydrogen and alkyl having 1 to 4 carbon atoms, $R_1$ is linear alkyl having 1 to 4 carbon atoms and $R_2$ is a member selected from the group consisting of hydrogen and methyl.

10. The product of claim 9 wherein Z is ethyl and $R_1$ and $R_2$ are methyl.

11. The product of claim 9 wherein Z is hydrogen and $R_1$ and $R_2$ are methyl.

12. The product of claim 9 wherein Z is ethyl, $R_1$ is methyl and $R_2$ is hydrogen.

* * * * *

UNITED STATES PATENT OFFICE
CERTIFICATE OF CORRECTION

Patent No. 3,897,417  Dated July 29, 1975

Inventor(s) JULIEN WARNANT AND JEAN JOLLY

It is certified that error appears in the above-identified patent and that said Letters Patent are hereby corrected as shown below:

| Col. | Line | |
|---|---|---|
| 2 | 10 | Formula cannot see 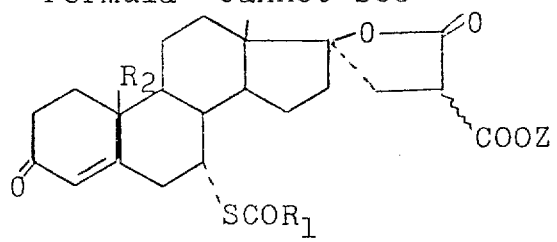 |
| 2 | 40 | Formula I cannot see 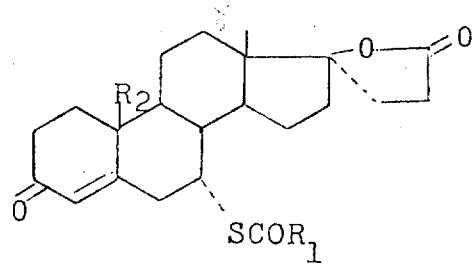 I |
| 3 | 1 | Formula III cannot see 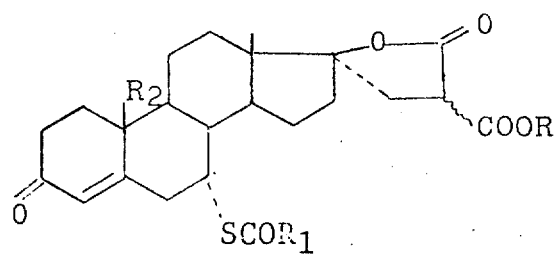 III |

UNITED STATES PATENT OFFICE
CERTIFICATE OF CORRECTION

Patent No. 3,897,417  Dated July 29, 1975

Inventor(s) JULIEN WARNANT AND JEAN JOLLY

It is certified that error appears in the above-identified patent and that said Letters Patent are hereby corrected as shown below:

| Col. | Line | |
|---|---|---|
| 3 | 41 | "Howeever" should be --However-- |
| 3 | 66 | After "Formula" insert --I'-- |
| 5 | 25 | Formula III' cannot see |

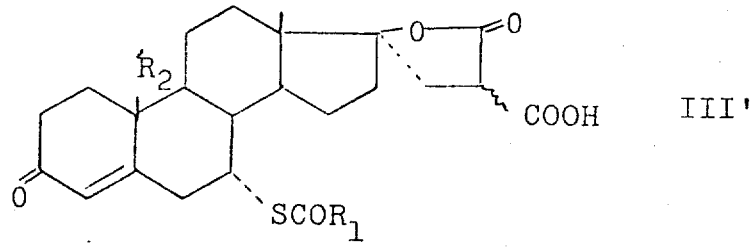

| | 60 | Formula V cannot see |
|---|---|---|

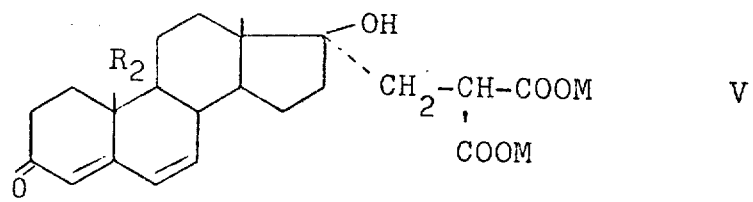

| | 30 | Formula I cannot see |
|---|---|---|

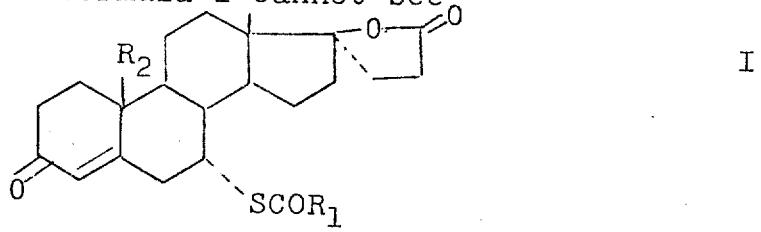

UNITED STATES PATENT OFFICE
CERTIFICATE OF CORRECTION

Patent No. 3,897,417     Dated July 29, 1975

Inventor(s) JULIEN WARNANT AND JEAN JOLLY

It is certified that error appears in the above-identified patent and that said Letters Patent are hereby corrected as shown below:

| Col. | Line | |
|---|---|---|
| 6 | 45 | Formula cannot see 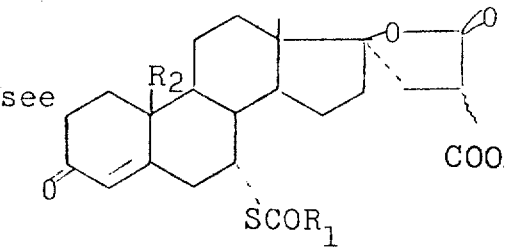 |
| 6 | 60 | Formula I' cannot see 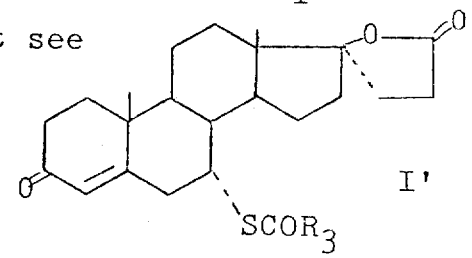 |
| 7 | 10 | Formula $III_A$ cannot see 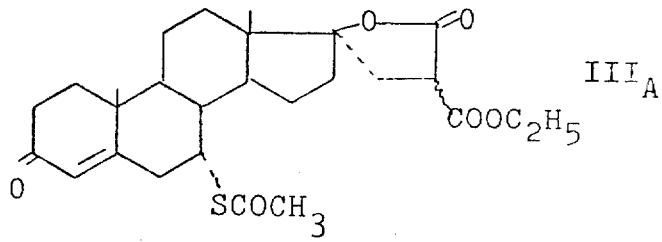 |

UNITED STATES PATENT OFFICE
CERTIFICATE OF CORRECTION

Patent No. 3,897,417  Dated July 29, 1975

Inventor(s) JULIEN WARNANT AND JEAN JOLLY

It is certified that error appears in the above-identified patent and that said Letters Patent are hereby corrected as shown below:

Col.  Line

60    Formula VIII cannot see

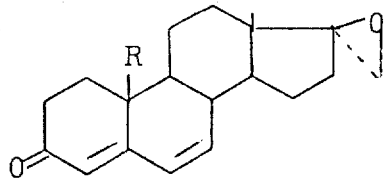

VIII

20    Formula VI cannot see

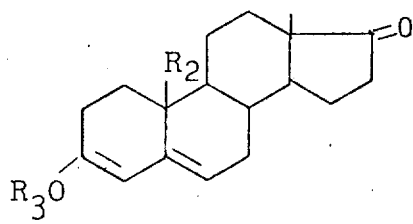

VI

35    Formula VII cannot see

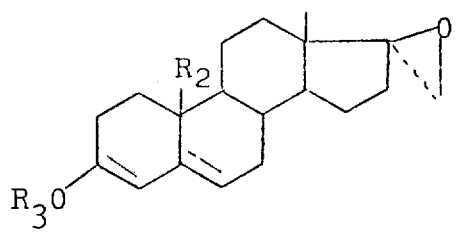

VII

UNITED STATES PATENT OFFICE
CERTIFICATE OF CORRECTION

Patent No. 3,897,417  Dated July 29, 1975

Inventor(s) JULIEN WARNANT AND JEAN JOLLY

It is certified that error appears in the above-identified patent and that said Letters Patent are hereby corrected as shown below:

| Col. | Line | |
|---|---|---|
| 9 | 50 | Formula VIII cannot see 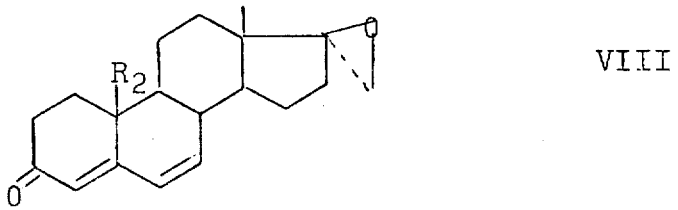 VIII |
| 10 | 5 | Formula II cannot see 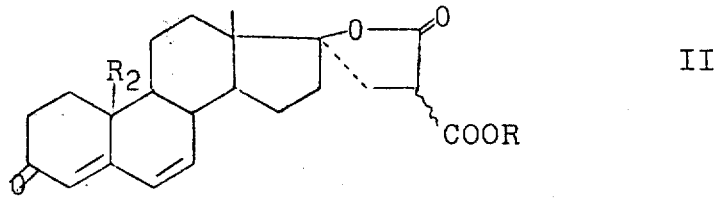 II |
| 10 | 20 | Formula III cannot see 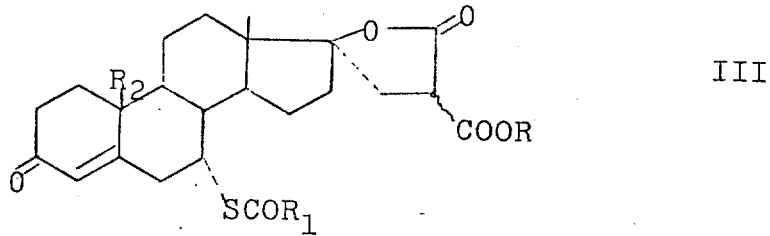 III |

UNITED STATES PATENT OFFICE
CERTIFICATE OF CORRECTION

Patent No. 3,897,417           Dated July 29, 1975

Inventor(s) JULIEN WARNANT AND JEAN JOLLY

It is certified that error appears in the above-identified patent and that said Letters Patent are hereby corrected as shown below:

Col.  Line 11    10              Formulaes cannot see

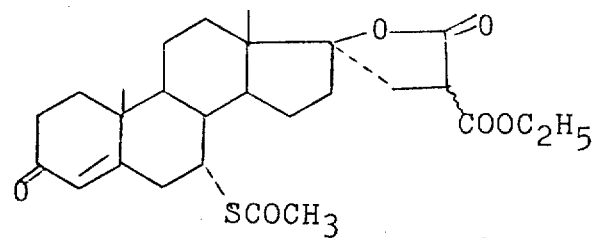

11    20

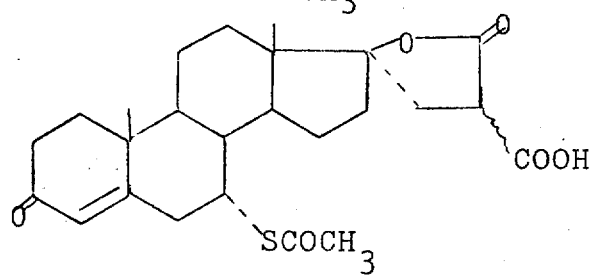

and 11    35

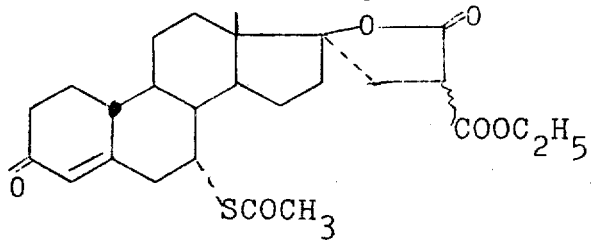

UNITED STATES PATENT OFFICE
CERTIFICATE OF CORRECTION

Patent No. 3,897,417  Dated July 29, 1975

Inventor(s) JULIEN WARNANT AND JEAN JOLLY

It is certified that error appears in the above-identified patent and that said Letters Patent are hereby corrected as shown below:

Col.  Line

IN THE CLAIMS 17   60   Claim 2   Formula cannot see

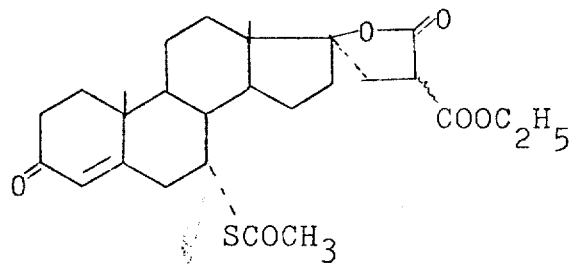

18   5    Claim 3   Formula cannot see

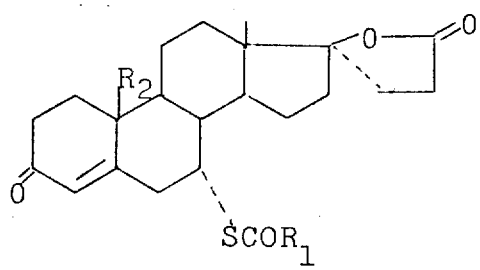

UNITED STATES PATENT OFFICE
CERTIFICATE OF CORRECTION

Patent No. 3,897,417　　　　　　　　　　Dated　July 29, 1975

Inventor(s)　JULIEN WARNANT AND JEAN JOLLY

It is certified that error appears in the above-identified patent and that said Letters Patent are hereby corrected as shown below:

Col. Line　Page Line

IN THE CLAIMS (Cont'd)

8　25　　Claim 3　　Formula cannot see

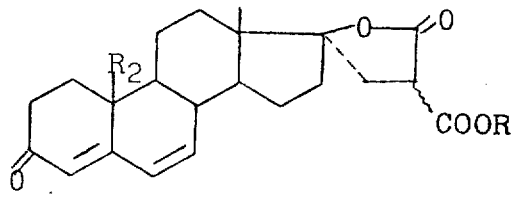

9　10　　Claim 5　　Formula cannot see

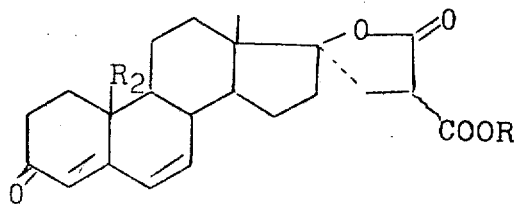

9　15　　Claim 6　　Formula cannot see

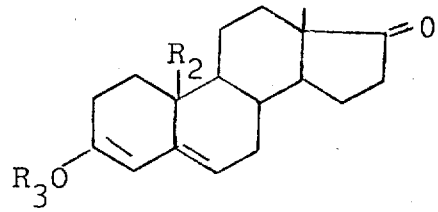

UNITED STATES PATENT OFFICE
CERTIFICATE OF CORRECTION

Patent No. 3,897,417　　　　　　　　　Dated July 29, 1975

Inventor(s) JULIEN WARNANT AND JEAN JOLLY

It is certified that error appears in the above-identified patent and that said Letters Patent are hereby corrected as shown below:

Col. Line
IN THE CLAIMS (Cont'd)

22　50　　Claim 7　　　Formula cannot see

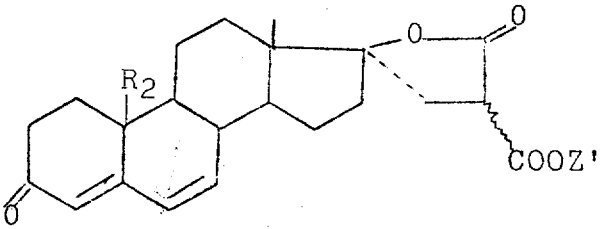

Signed and Sealed this

Third Day of August 1976

[SEAL]

Attest:

RUTH C. MASON
Attesting Officer

C. MARSHALL DANN
Commissioner of Patents and Trademarks